United States Patent [19]

Chapman

[11] Patent Number: 4,556,131
[45] Date of Patent: Dec. 3, 1985

[54] DOUBLE OUTPUT TORQUE LIMITER

[75] Inventor: John R. Chapman, Rockford, Ill.

[73] Assignee: Sundstrand Corporation, Rockford, Ill.

[21] Appl. No.: 541,358

[22] Filed: Oct. 11, 1983

[51] Int. Cl.[4] ............................................. F16D 59/00
[52] U.S. Cl. ................................... 192/7; 192/55; 192/78
[58] Field of Search ...................... 192/7, 8 R, 54, 55, 192/76, 78, 75, 77; 188/134

[56] References Cited

U.S. PATENT DOCUMENTS

| | | | |
|---|---|---|---|
| 2,359,010 | 9/1944 | Smith | 192/8 |
| 2,993,569 | 7/1961 | Cole, Jr. | 188/134 |
| 3,051,282 | 8/1962 | Greene | 192/8 |
| 3,307,663 | 3/1967 | Luenberger | 192/8 |
| 3,367,456 | 2/1968 | Bohnhoff | 192/7 X |
| 3,468,403 | 9/1969 | Nasvytis | 192/7 X |
| 3,497,044 | 2/1970 | Kalns | 192/8 |
| 3,499,511 | 3/1970 | Bouhot | 192/7 X |
| 3,542,162 | 11/1970 | Kerr | 192/7 X |
| 3,587,796 | 6/1971 | Nestvogel | 192/8 |
| 3,596,740 | 8/1971 | Nau | 192/8 R X |
| 3,640,092 | 2/1972 | Neal et al. | 188/134 X |
| 3,656,597 | 4/1972 | Gruchmann et al. | 192/76 X |
| 3,667,575 | 6/1972 | Bouhot | 192/7 X |
| 3,789,965 | 2/1974 | Heidorn | 192/54 X |
| 4,030,578 | 6/1977 | Cacciola et al. | 188/134 |
| 4,176,733 | 12/1979 | Twickler | 188/134 |
| 4,346,793 | 8/1982 | Fuse et al. | 192/54 X |

FOREIGN PATENT DOCUMENTS

| | | | |
|---|---|---|---|
| 1211874 | 3/1966 | Fed. Rep. of Germany | 192/54 |
| 2134506 | 7/1970 | Fed. Rep. of Germany | 192/7 |

Primary Examiner—Rodney H. Bonck
Assistant Examiner—Dwight G. Diehl
Attorney, Agent, or Firm—Wood, Dalton, Phillips, Mason & Rowe

[57] ABSTRACT

According to the invention a housing is provided defining concentric, cylindrical first and second braking surfaces. First and second cylindrical, concentric torque tubes are provided within the annular gap between braking surfaces and are each split lengthwise sufficiently to permit slight, radial deflection into engagement with the respective braking surfaces on the housing to which it is adjacent. An input carrier is provided to transmit the torque between a prime mover and an output position on the torque tubes. The carrier has a plurality of fingers which project between and are aligned axially with the torque tubes. Each of the torque tubes is operatively engaged with an output member so that the torque imparted by a common drive to each output can be simultaneously controlled.

12 Claims, 3 Drawing Figures

DOUBLE OUTPUT TORQUE LIMITER

FIELD OF THE INVENTION

This invention pertains to torque limiting devices, and, more particularly, to a device for simultaneously protecting commonly driven separate outputs from excessive torque magnitude.

BACKGROUND OF THE INVENTION

Torque limiting devices are commonly used to insulate the driven side of a transmission assembly from excessive intermittent surges of torque and/or continuous excessive torque applied by a driving, input side.

Exemplary of such a structure is that shown in U.S. Pat. No. 3,640,092, to Neal et al. In Neal et al, a fixed, cylindrical, outer race retains internally a cam constituting the input member and an associated roller cage constituting the output member and operatively engaged with a plurality of rollers. The input and output members are connected by a torsion spring or other suitable member capable of deflection when subjected to a predetermined input torque. The application of excessive torque through either the input or output member causes relative rotational movement between the cam and cage, thereby wedging the rollers to stall the input torque.

The structure in Neal et al has several drawbacks. The Neal et al structure is suitable for the control of but a single output. Consequently, where a plurality of torque responsive elements are driven from a single drive source, multiple torque limiting devices would have to be employed.

An alternative torque limiting arrangement is disclosed in U.S. Pat. No. 3,497,044, to Kalns. In Kalns, a pair of brake shoes are provided within and conformed substantially to a cylindrical drum surface formed interiorally of a housing. The brake shoes are maintained disengaged from the drum surface by an arrangement of springs which draws the paired brake shoes, each towards the other. Shoe actuating control pins are provided and maintain the shoes separated from one another against the force of the springs, with each pin projecting axially outwardly of the shoes and terminating in a rounded head which engages the input member. Under a predetermined excessive input torque, the pins tilt reactively and exert a spreading force on the shoes, thereby biasing the shoes into engagement with the drum surface, to damp the torque.

The structure in Kalns, as in Neal et al, is restricted to limiting the torque of a single output. Further, a complicated structure is required to retain the brake shoes in a retracted position as well as to cause engagement of the brake shoes with the drum surface at the predetermined torque. Still further, reliance on the pin tilting to engage the shoes and drum and single surface engagement between each brake shoe and drum results in non-positive and unpredictable torque control.

This invention is specifically directed to overcoming the problems enumerated above.

SUMMARY OF THE INVENTION

It is the principal object of the present invention to provide a torque limiting apparatus for a single drive member that is simple yet which affords instantaneous and positive, torque-limiting control at separate outputs.

According to the invention, a housing is provided defining concentric, cylindrical first and second braking surfaces. First and second cylindrical, concentric torque tubes are provided within the annular gap between braking surfaces and are each split lengthwise sufficiently to permit slight, radial deflection into engagement with the respective braking surface on the housing to which it is adjacent. An input carrier is provided to transmit the torque between a prime mover and an output position on the torque tubes. The carrier has a plurality of fingers which project between and are aligned axially with the torque tubes.

Each of the tubes has formed pockets to accommodate the fingers and is ramped so that the tubes cooperatively define an opening converging away from the axis of the finger. Upon encountering an excessive, predetermined, output torque, the fingers traverse the ramped portions and simultaneously wedge the first and second torque tubes against the first and second braking surfaces, thereby absorbing the excess torque. Inclusion of converging openings on both sides of the fingers makes possible bidirectional torque damping.

The torque tubes are separately geared to drive the torque responsive elements. This can be accomplished by extending the inner tube axially beyond the outer tube and providing the circumferential surfaces of each tube with a gear for engaging the output. Elimination of one torque limiter results in obvious cost and weight savings. This latter advantage is particularly beneficial in application with an aircraft control surface actuation system where weight control is critical.

DESCRIPTION OF THE PREFERRED EMBODIMENT

Figure 1:
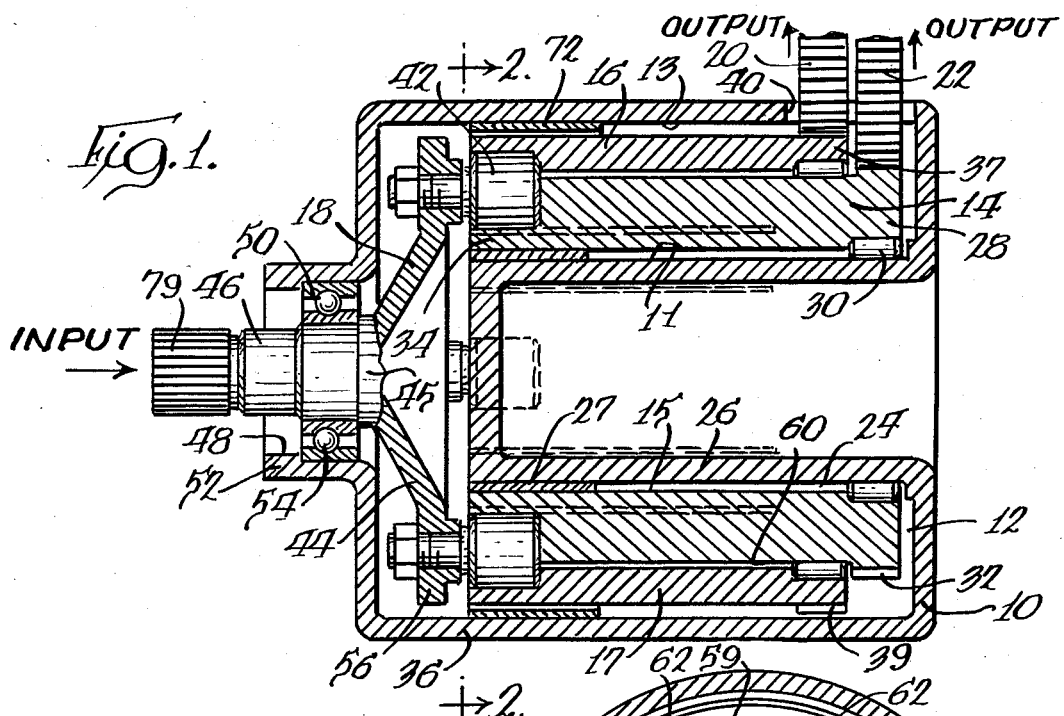
FIG. 1 is a sectional view of a preferred form of torque limiter according to the present invention.
Figure 2:
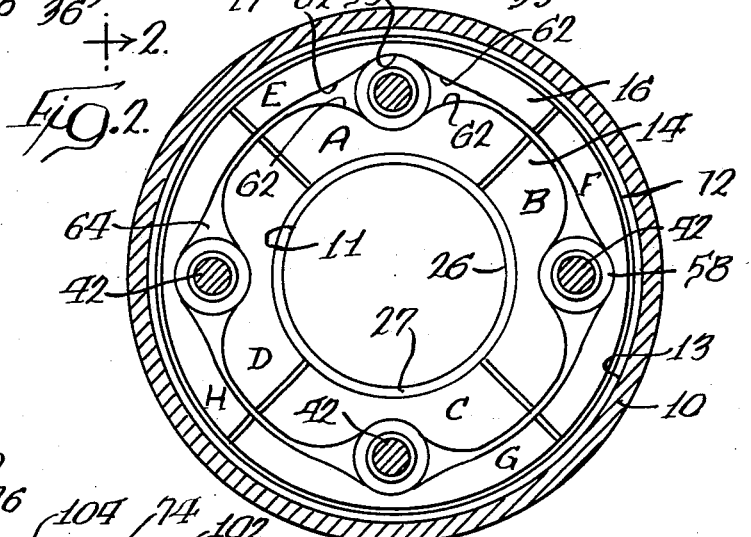
FIG. 2 is a sectional view of the torque limiter taken along line 2—2 of FIG. 1.

Referring initially to FIGS. 1 and 2, a preferred form of the invention is depicted and comprises essentially a housing 10 defining radially inner and outer concentric, cylindrical braking surfaces, 11 and 13 respectively, and annular chamber 12 containing an inner tubular torque tube 14 and thinner outer tubular torque tube 16 respectfively with braking surfaces 15 and 17 for engagement with the adjacent braking surface 11, 13. The torque tubes 14, 16 transmit a driving force from a prime mover (not shown), through an intermediate carrier mechanism 18 and are drivingly coupled to a pair of output gears 20, 22.

The torque tubes 14, 16 are concentrically arranged with each other and within the chamber 12. A slight annular gap 24 is provided between the inner wall 26 of the housing 10 and the inner torque tube 14. The free output end 28 of the inner tube 14, remote from the input, is maintained substantially rigidly in position between a bearing 30 about the inner housing wall 26 and the output gear 22, which meshes with a gear 32 on the peripheral surface of the inner torque tube, adjacent the free end 28. The input end 34 of the inner tube 14 is centered about the inner wall 26, with a layer of friction generating material 27 disposed in the gap 24 therebetween.

The outer torque tube 16 is flush axially with the inner torque tube 14 adjacent the input end 34 and extends axially short of the output gear 22 associated with the inner torque tube 14 at the output end 28. The free end 37 of the outer torque tube is maintained rigidly between the output gear 20 and a bearing 38 interposed between the inner and outer torque tubes. The output gear 20 meshes with a gear 39 disposed about the periphery of the outer tube, adjacent its free end 37. An opening 40 is provided in the housing to accommodate both output gears 20, 22.

The torque tubes 14, 16 are rotated simultaneously by a plurality of fingers 42 rigidly attached to the carrier mechanism 18. The carrier mechanism 18 comprises a cone-shaped body 44 opening toward the output end. The apex 45 of the cone is connected integrally with an input shaft 46 which is journalled in a reduced diameter opening 48 at the extremity of the housing 10. A ball bearing 50 is interposed between the wall 52 and the outer surface 54 of the body of the shaft to facilitate rotation and is located positively by an annular undercut in the wall 52.

The free end of the body 44 of the carrier mechanism 18 is outturned to define a peripheral rim 56 that resides perpendicularly to the axis of the chamber 12. The fingers 42 are spaced equidistantly about the rim 56 and project in axial alignment with the chamber 12. Each finger 42 comprises a cylindrical body 58 secured suitably, as by bolting, to the rim 56. As shown, there are four fingers 42, however the actual number can vary.

The fingers 42 are arranged to maintain a substantially uniform annular gap 60 between the inner and outer torque tubes adjacent the input end of the apparatus. The inner and outer torque tubes 14, 16 have pockets 59 formed to accommodate the cylindrical bodies 58 as seen most clearly in FIG. 2. Each of the tubes 14, 16 has a defined ramp 62 in the vicinity of the fingers 42, with the ramps 62 on the first and second tubes cooperatively defining converging openings 64 extending oppositely away from each tube.

Each of the torque tubes 14, 16 is segmented by longitudinal slits 70 extending substantially radially and equidistantly about the tubes. The slits are equal in number to the fingers 42 and are provided in each tube 14, 16 and respectively divide the tube into segments A, B, C D and E, F, G, H, each of approximately 90°. The slits extend lengthwise from the input end sufficiently to permit radial deflection of the tube segments A–H at the input end and terminate short of the output gears to maintain the integrity of the tubes 14, 16 at the outlet end and keep the output gearing in alignment.

In operation, a drive force is initiated at the input shaft by a prime mover (not shown). The free end 79 of the shaft is splined to key the connection with the prime mover. Rotation imparted to the shaft is transmitted through the carrier mechanism 18, which in turn rotates the fingers 42 captured between the inner and outer tubes. Rotation of the fingers causes rotation of the torque tubes and the associated output gears 20, 22. When an excessive torque is applied to one of the gears 20, 22 the fingers 42 rotate relative to the tubes 14, 16 and traverse the ramps on one side of the fingers, depending on the direction of rotation. The fingers 42, upon such movement, simultaneously deflect the segments of the outer tube 16 and the surface 17 into braking frictional engagement with a friction generating material 72 on the second braking surface 13 and the segments of the inner tube 14 and the surface 15 against the friction generating material 27 on the first braking surface. The provision of separate torque tubes makes possible the torque limiting at two output positions with the use of a single input driver.

It can be seen that the thickness and elasticity of the torque tubes as well as their related dimension and spacing and the associated dimension of the housings can be chosen depending on the particular limiting requirements. Other variables to be considered are the axial extent of the slits 70 and the ramp angle. By shortening the length of the slits, rigidifying the tubes and/or increasing the clearance between the tubes and housings, the predetermined torque at which limiting is effected is increased.

Figure 3:
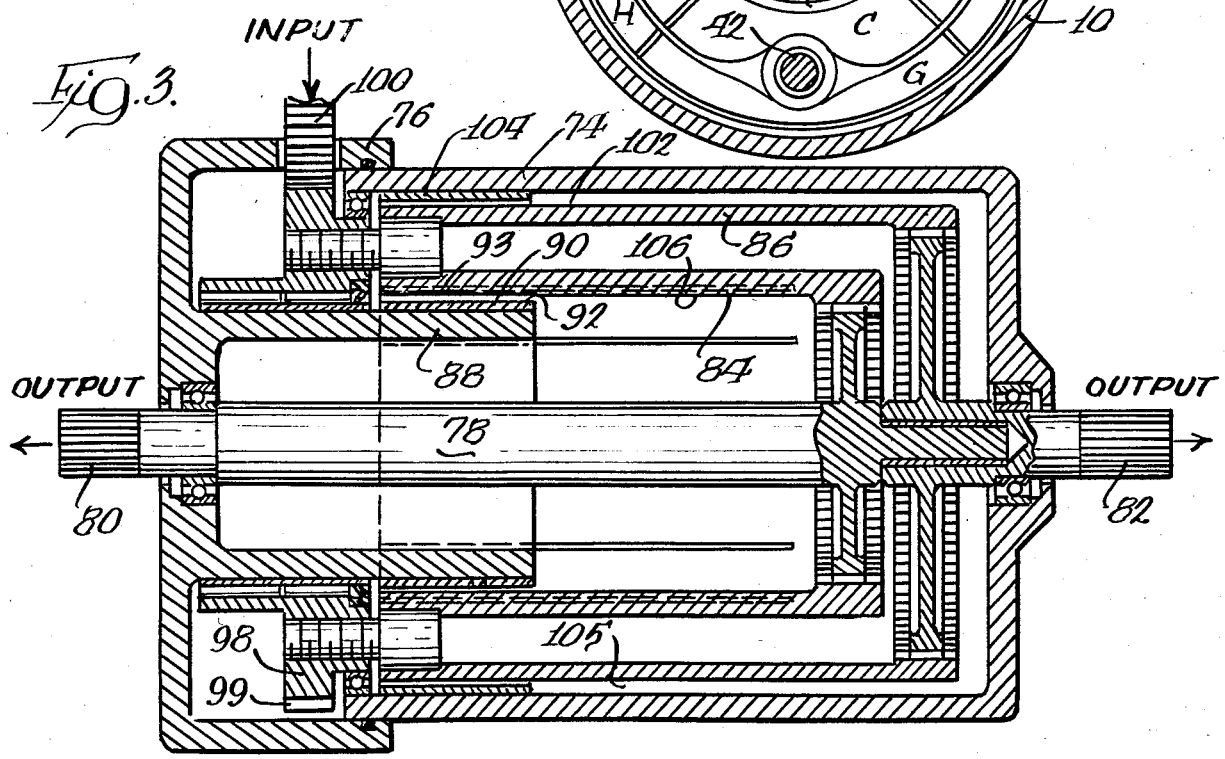
FIG. 3 is a sectional view of an alternative torque limiter construction according to the invention.

A modified form of the invention is illustrated in FIG. 3 and comprises joinable housing portions 74, 76 defining a cylindrical configuration which coaxially retains an output shaft 78 having two free, splined drive ends 80, 82. Corresponding inner and outer torque tubes, 84, 86 respectively, are arranged concentrically and engage closely about the output shaft 78. The one housing portion 76 has a reduced diameter, internal, annular rim 88 having an outer peripheral braking surface 90 to which is bonded a friction-generating material 92. The end of the inner torque tube remote from the free end 93, surrounding the rim 88, is rigidly affixed to the shaft 78 and rotatable therewith. The outer torque tube 86 is likewise rigidly maintain at one end 94 with the shaft 78, with the other end 95 spaced by corresponding fingers 96 spaced circumferentially about an annular drive member 98.

The drive member 98 has an outer ring gear 99 which is drivingly engaged with the rotatable input gear 100. Rotation of the input gear 100 causes the fingers 96 to rotate and simultaneously rotates the free drive ends 80,82. Excessive output torque causes the fingers to move, as in the previous embodiment, relative to the tubes 84, 86 and in converging openings to bias the peripheral surface 102 of the outer torque tube against the friction generating material 104 interposed in the annular gap 105 defined between the housing 76 and the inner torque tube 84. Simultaneously the inner surface 104 is wedged against the friction-generating material 92 on the rim 88.

It should be understood that the above description was made for purposes of clarifying the operation of the invention with no unnecessary limitations to be derived therefrom.

I claim:
1. An apparatus for limiting torque applied by a driving member to a driven member comprising:
    first and second torque members having coincident rotational axes and positioned one radially inside the other;
    first and second braking surfaces respectively on the first and second torque members;
    a housing having first and second braking surfaces spaced radially apart with respect to the axes of the torque members and facing, respectively the first and second braking surfaces on the torque members for engagement therewith;
    first means interconnecting said driven member with at least one of said first and second torque members whereby rotation of the one of said first and second torque members drives said driven member;
    second means for imparting rotational movement from said driving member to said first and second torque members; and third means for simultaneously engaging said first and second braking surfaces on the torque members with the corresponding braking surfaces on the housing and fixing the position of the first and second torque members relative to the housing at a predetermined torque to prevent excessive torque on the driven member.

2. The torque limiting apparatus of claim 1 wherein friction generating material is disposed between the first braking surfaces on the first torque member and the housing and the second braking surfaces on the second torque member and the housing.

3. An apparatus for limiting torque applied by a driving member to a driven member comprising:
a first torque member having a rotational axis and a first braking surface;
a second torque member having a rotational axis coincident with the axis of the first torque member and a second braking surface;
a housing having first and second braking surfaces for engagement respectively with the first and second braking surfaces on the torque members;
first means interconnecting said driven member with at least one of said first and second torque members whereby rotation of the one of said first and second torque members drives said driven member;
second means for imparting rotational movement from said driving member to said first and second torque members; and
third means for simultaneously engaging said first and second braking surfaces on the torque members with the corresponding braking surfaces on the housing at a predetermined torque to prevent excessive torque on the driven member,
said first and second torque members each have a cylindrical configuration and a plurality of slits extend lengthwise at least partially along each said first and second torque members thereby defining radially deflectable segments engagable with the first and second braking surfaces on the housing.

4. An apparatus for limiting torque applied by a driving member to a driven member comprising:
a first torque member having a rotational axis and a first braking surface;
a second torque member having a rotational axis coincident with the axis of the first torque member and a second braking surface;
a housing having first and second braking surfaces for engagement respectively with the first and second braking surfaces on the torque members;
friction generating material disposed between at least one of the first braking surfaces and the second braking surfaces;
first means interconnecting said driven member with at least one of said first and second torque members whereby rotation of the one of said first and second torque members drives said driven member;
second means for imparting rotational movement from said driving member to said first and second torque members comprising a plurality of axially extending fingers interposed between the first and second torque members; and
third means for simultaneously engaging said first and second braking surfaces on the torque members with the corresponding braking surfaces on the housing at a predetermined torque to prevent excessive torque on the driven member, said third means comprising a ramped surface provided on at least one of said first and second torque members, said ramped surface causing said first and second braking surfaces on the torque members to simultaneously engage the corresponding braking surfaces on the housing as the fingers rotate relative to the first and second torque members at said predetermined torque.

5. The torque limiting apparatus of claim 3 wherein said third means comprises a ramped surface on said first and second torque member and the ramped surfaces on the first and second torque members cooperatively define a converging opening extending away from each said finger.

6. The torque limiting apparatus of claim 4 wherein the fingers are arranged in a circular pattern and are spaced equidistantly to provide for uniform braking.

7. An apparatus for limiting torque applied by a driving member to first and second driven members comprising:
a first cylindrical torque member having a rotational axis and a first braking surface;
a second cylindrical torque member having a rotational axis coincident with the first torque member, said second cylindrical torque member in axial overlapping relationship with the first cylindrical torque member;
a housing having a first braking surface for engagement with the braking surface on the first torque member;
first means for transmitting rotational movement from said driving member simultaneously to said first and second torque members;
second means for engaging the braking surfaces on the housing and the first torque member at a predetermined torque to prevent excessive torque on the driven members;
means operatively engaging the first driven member with the first torque member; and
means operatively engaging the second driven member with the second torque member.

8. An apparatus for limiting torque applied by a driving member to first and second driven members comprising:
a first cylindrical torque member having a rotational axis and a first braking surface;
a second cylindrical torque member having a rotational axis coincident with the first torque member and a second braking surface;
a housing having a first braking surface for engagement with the braking surface on the first torque member and second braking surface;
first means for transmitting rotational movement from said driving member simultaneously to said first and second torque members;
second means for engaging the braking surfaces on the housing and the first torque member at a predetermined torque to prevent excessive torque on the driven members, said second means comprising a plurality of axially extending fingers interposed between the first and second torque members;
means operatively engaging the first driven member with the first torque member; and
means operatively engaging the second driven member with the second torque member; and
ramp means on at least one of said first and second torque members, said ramp means causing said first and second braking surfaces on the torque members to simultaneously engage the corresponding braking surfaces on the housing as the fingers rotate relative to the first and second torque members at said predetermined torque.

9. The torque limiting apparatus of claim 7 wherein one of said first and second torque members has a portion extending axially beyond the other of the first and second torque members and means are provided to operatively engage one of the first and second driven members with said portion and separate means operatively engage the other of the first and second driven members with the other of the first and second torque members.

10. An apparatus for limiting torque applied by a driving member to first and second driven members comprising:
- a housing having a cylindrical inner chamber;
- a first braking surface on said housing within said chamber;
- a second braking surface on said housing and spaced radially from said first braking surface;
- first and second radially spaced cylindrical concentric torque tubes within said chamber each said torque tube having a plurality of lengthwise slits defining radially deflectable segments;
- a first braking surface on the first torque tube adjacent the first braking surface on the housing;
- a second braking surface on the second torque tube adjacent the second braking surface on the housing;
- driving means including a plurality of fingers disposed between and simultaneously rotating said first and second torque tubes;
- ramp means associated with each said first and second torque tubes, said ramp means on said first and second torque tubes cooperatively defining a converging opening extending away from each said finger; and
- means operatively engaging the first and second driven members respectively with the first and second torque tubes, said ramp means causing said first and second braking surfaces on the torque tubes to deflect and frictionally engage its respective adjacent braking surface on the housing as the fingers rotate relative to the first and second torque members at a predetermined torque, whereby excess torque is absorbed.

11. The torque limiting apparatus of claim 10 wherein said first and second braking surfaces on said housing are each substantially cylindrical and substantially in concentric alignment with each other and said first and second torque tubes.

12. A double output torque limiter comprising:
- a pair of concentric tubes positioned one inside the other and each having an axially split portion;
- a pair of driven members connected one to each of said tubes;
- a housing having parts exteriorly and interiorly of said concentric tubes with brake material thereon and normally spaced therefrom;
- a driving member having fingers positioned between the axially split portions of the tubes; and
- means responsive to an excessive amount of torque applied to the driving member for flexing the axially split portions of the tubes into engagement with said brake material.

* * * * *